US 6,590,749 B1

(12) United States Patent
Gill

(10) Patent No.: US 6,590,749 B1
(45) Date of Patent: Jul. 8, 2003

(54) DUAL AP PINNED SPIN VALVE SENSOR BIASED BY OPPOSITE FERROMAGNETIC COUPLING FIELDS AND OPPOSITE DEMAGNETIZING FIELDS

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 09/635,719

(22) Filed: Aug. 9, 2000

(51) Int. Cl.[7] .................................................. G11B 5/39
(52) U.S. Cl. .................... 360/324.11; 360/314
(58) Field of Search ............................. 360/314, 324.1, 360/324.11, 324.12

(56) References Cited

U.S. PATENT DOCUMENTS

| 5,705,973 A | 1/1998 | Yuan et al. ............. 338/32 |
| 5,840,420 A | 11/1998 | Parker et al. ............. 428/332 |
| 5,869,963 A | 2/1999 | Saito et al. ............. 324/252 |
| 5,880,913 A | 3/1999 | Gill ............. 360/113 |
| 5,903,415 A | 5/1999 | Gill ............. 360/113 |
| 6,301,089 B1 * | 10/2001 | Saito et al. ............. 360/314 |
| 6,317,297 B1 * | 11/2001 | Tong et al. ............. 360/314 |
| 6,347,022 B1 * | 2/2002 | Saito ............. 360/126 |
| 6,381,105 B1 * | 4/2002 | Huai et al. ............. 360/314 |
| 6,404,606 B1 * | 6/2002 | Pinarbasi ............. 360/324.11 |
| 6,418,000 B1 * | 7/2002 | Gibbons et al. ......... 360/324.11 |
| 6,424,506 B1 * | 7/2002 | Saito et al. ............. 360/324.11 |

* cited by examiner

Primary Examiner—David L. Ometz
(74) Attorney, Agent, or Firm—Ervin F. Johnston

(57) ABSTRACT

A dual antiparallel (AP) pinned spin valve sensor has a free layer which is biased by opposite ferromagnetic coupling fields and opposite demagnetizing fields from first and second AP pinned layer structures. The opposite magnetic coupling fields are obtained by appropriately sizing first and second spacer layers of the sensor and the opposite demagnetizing fields are obtained by appropriately sizing first and second AP pinned layers of a first AP pinned layer structure and appropriately sizing third and fourth AP pinned layers of a second AP pinned layer structure.

54 Claims, 8 Drawing Sheets

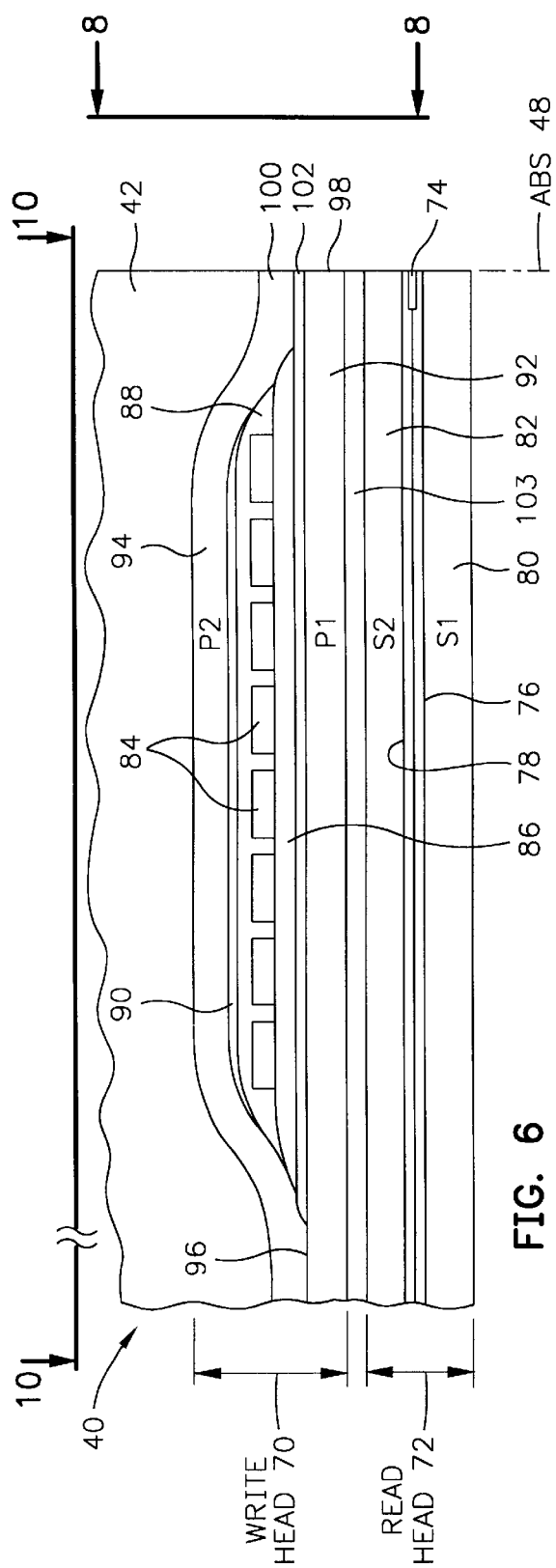
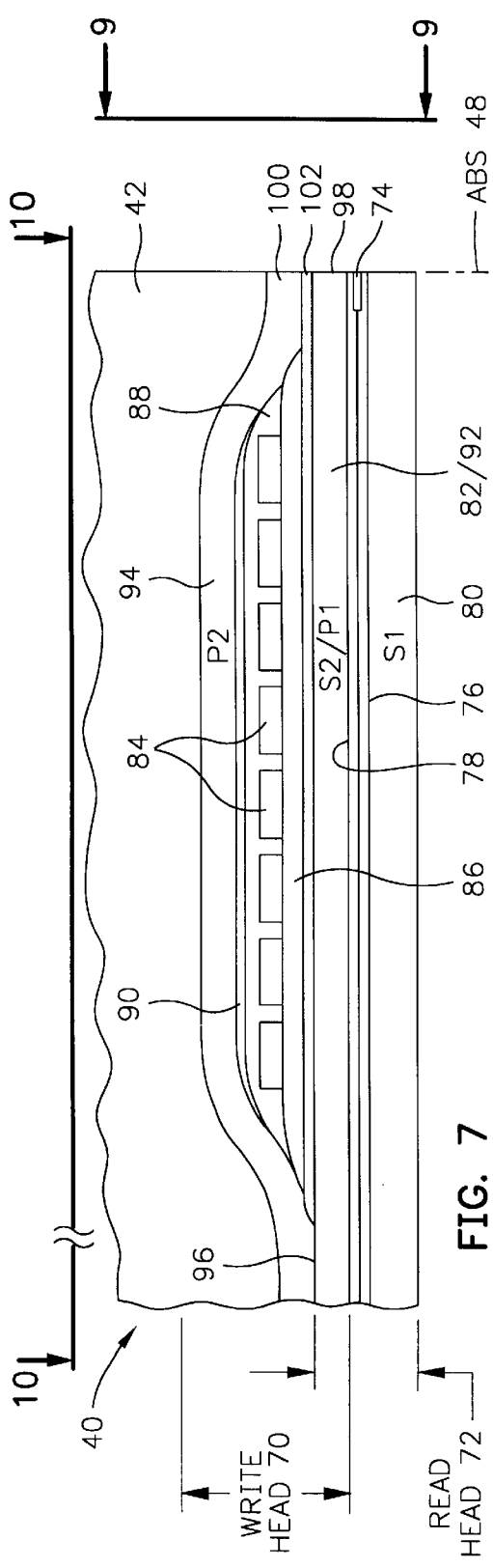
FIG. 6
FIG. 7

(ABS)

DUAL AP PINNED SPIN VALVE SENSOR BIASED BY OPPOSITE FERROMAGNETIC COUPLING FIELDS AND OPPOSITE DEMAGNETIZING FIELDS

BACKGROUND OF THE INVENTION

1. Field of the Invention

The present invention relates to a dual antiparallel (AP) pinned spin valve sensor biased by opposite ferromagnetic coupling fields and opposite demagnetizing fields and, more particularly, to a dual AP pinned spin valve sensor wherein ferromagnetic coupling fields exerted on a free layer by first and second AP pinned layer structures are antiparallel and net demagnetizing fields exerted on the free layer by the first and second AP pinned layer structures are antiparallel.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry, which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of cos θ, where θ is the angle between the magnetic moments of the pinned and free layers. When a sense current is conducted through the spin valve sensor, resistance changes cause potential changes that are detected and processed as playback signals from the rotating magnetic disk.

The sensitivity of the spin valve sensor is quantified as magneto-resistance or magnetoresistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. Because of the high magnetoresistance of a spin valve sensor it is sometimes referred to as a giant magnetoresistive (GMR) sensor.

The transfer curve for a spin valve sensor is defined by the aforementioned cos θ where θ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields that are equal from the magnetic disk. Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. The designer strives to improve asymmetry of the readback signals as much as practical with the goal being symmetry. When the readback signals are asymmetrical, signal output and dynamic range of the sensor are reduced. The location of the bias point on the transfer curve is influenced by three major forces on the free layer, namely a demagnetization field $H_D$ from the pinned layer, a ferromagnetic coupling field $H_F$ between the pinned layer and the free layer, and sense current fields $H_I$ from all conductive layers of the spin valve except the free layer.

A dual spin valve sensor may be employed for increasing the magnetoresistive coefficient dr/R of a read head. In a dual spin valve sensor first and second pinned layer structures are employed with a first spacer layer between the first pinned layer structure and the free layer and a second spacer layer located between the second pinned structure and the free layer. With this arrangement the spin valve effect is additive on each side of the free layer to increase the magnetoresistive coefficient dr/R of the read head. In order to reduce demagnetizing fields HD from the first and second pinned layers on the free layer, each of the pinned layers may be an antiparallel (AP) pinned layer structure. The first AP pinned layer structure has an antiparallel coupling (APC) layer which is located between ferromagnetic first and second AP pinned layers (AP1) and (AP2) and the second AP pinned layer structure has an antiparallel coupling layer between third and fourth AP pinned layers (AP3) and (AP4). The AP pinned layers of each AP pinned layer structure have magnetic moments which are antiparallel with respect to one another because of a strong antiferromagnetic coupling therebetween. The AP pinned layer structure is fully described in commonly assigned U.S. Pat. No. 5,465,185 which is incorporated by reference herein. Because of the partial flux closure between the AP pinned layers of each first and second AP pinned layer structures, each AP pinned layer structure exerts a small demagnetizing field on the free layer. These demagnetizing fields, however, are typically additive since the magnetic moments of the AP pinned layers immediately adjacent the free layer structure must be in-phase (parallel with respect to one another) in order for the spin valve effect to be additive. Further, the magnetic moments of the AP pinned layers spaced from the free layer by the spacer layers exert ferromagnetic coupling fields $H_F$ on the free layer which are also typically additive and parallel to the demagnetizing fields $H_D$. Accordingly, a net demagnetizing field $H_D$, which is the total of the demagnetizing fields from the AP pinned layer structures, and a net ferromagnetic coupling field $H_{FC}$, which is the total of the ferromagnetic coupling fields, act on the free layer. The net demagnetizing field and the net ferromagnetic coupling field are typically additive to urge the magnetic moment of the free layer structure from its zero bias position parallel to the ABS. There is a strong-felt need to counterbalance these magnetic fields on the free layer so as to obtain proper biasing.

SUMMARY OF THE INVENTION

The present invention provides a dual AP pinned spin valve sensor with a structure which causes the ferromagnetic coupling fields from the first and second AP pinned layer structures to oppose or counterbalance each other and demagnetizing fields from the first and second AP pinned layer structures which oppose or counterbalance each other. In order to cause the ferromagnetic coupling fields to oppose one another, the first and second spacer layers are appropriately sized in their thickness so that one of the ferromagnetic coupling fields has a negative polarity and the other ferromagnetic coupling field has a positive polarity. In a preferred embodiment this is accomplished by employing platinum manganese (PtMn) for the first and second pinning layers with first, second and third seed layers for the first pinning layer wherein the first seed layer is composed of aluminum oxide ($Al_2O_3$), the second seed layer is composed of nickel manganese oxide (NiMnO) and the third seed layer is composed of tantalum (Ta). The demagnetizing fields from the first and second AP pinned layer structures oppose one another by appropriately sizing the thicknesses of the first and second AP pinned layers of the first AP pinned layer structure and the third and fourth AP pinned layers of the second AP pinned layer structure. In a first embodiment of the invention the second AP pinned layer is thicker than the first AP pinned layer and the third AP pinned layer is thicker than the fourth AP pinned layer. In another embodiment the first AP pinned layer may be thicker than the second AP pinned layer and the fourth AP pinned layer may be thicker than the third AP pinned layer. In both embodiments a pulse may be conducted through the sense current circuit for setting each of the first and second pinning layers. Further, sense current fields from the conductive layers of the spin valve sensor will support the pinning direction of the magnetic spins of the first and second pinning layers when the sense current is appropriately directed so as to enhance thermal stability of the read head. In a preferred embodiment the magnetic thicknesses of the first and fourth AP pinned layers are equal and the magnetic thicknesses of the second and third AP pinned layers are equal. With this arrangement the net demagnetizing field on the free layer is zero.

An object of the present invention is to provide a dual AP pinned spin valve sensor wherein ferromagnetic coupling fields from first and second AP pinned layer structures oppose one another and demagnetizing fields from the first and second AP pinned layer structures oppose one another.

A further object is to provide the aforementioned dual AP pinned spin valve sensor wherein the net ferromagnetic coupling field on the free layer is zero and the net demagnetizing field on the free layer is zero.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
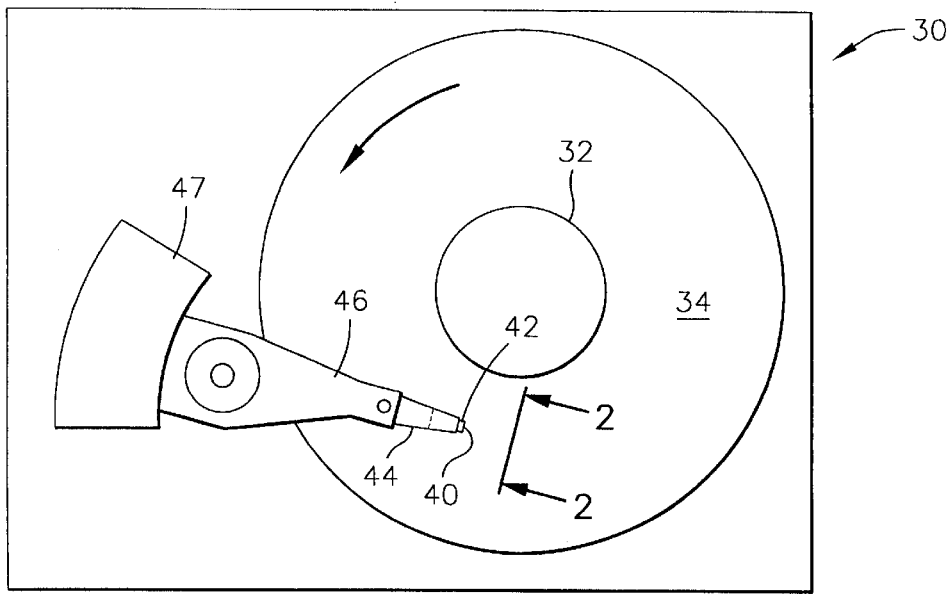
FIG. 1 is a plan view of an exemplary magnetic disk drive.
Figure 2:
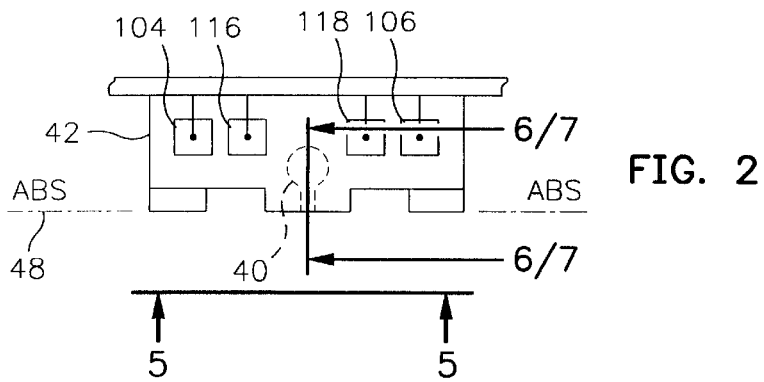
FIG. 2 is an end view of a slider with a magnetic head of the disk drive as seen in plane 2—2 of FIG. 1.
Figure 3:
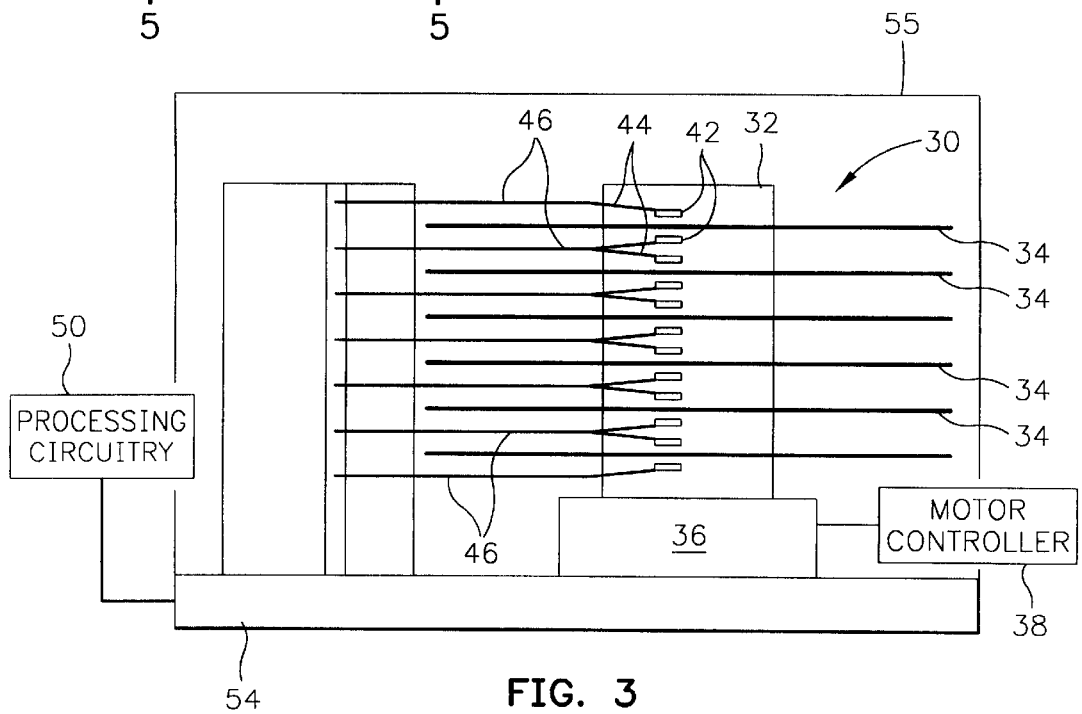
FIG. 3 is an elevation view of the magnetic disk drive wherein multiple disks and magnetic heads are employed.
Figure 4:
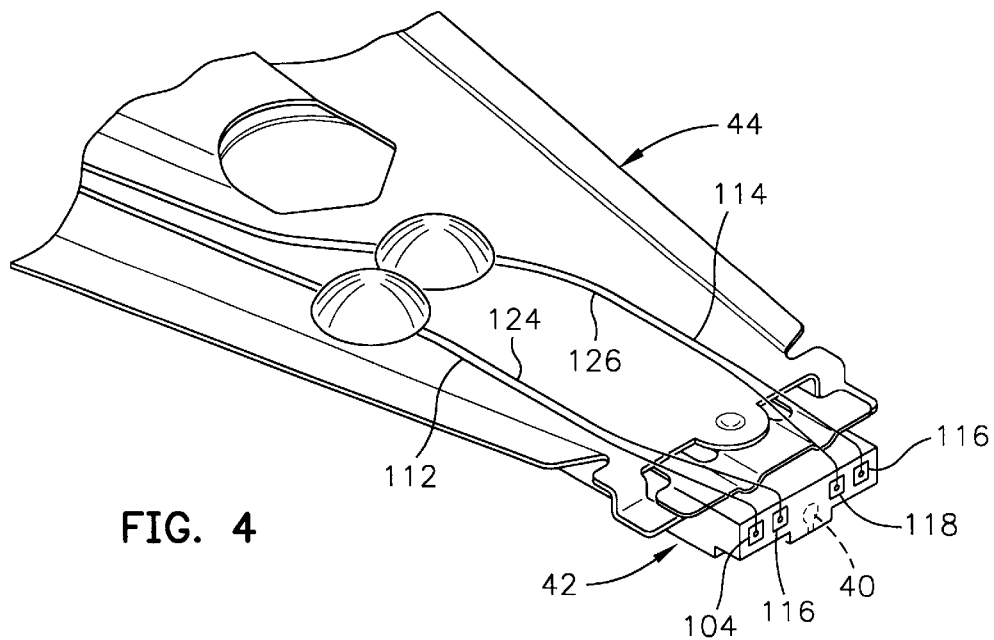
FIG. 4 is an isometric illustration of an exemplary suspension system for supporting the slider and magnetic head.

Referring now to the drawings wherein like reference numerals designate like or similar parts throughout the several views, FIGS. 1—3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
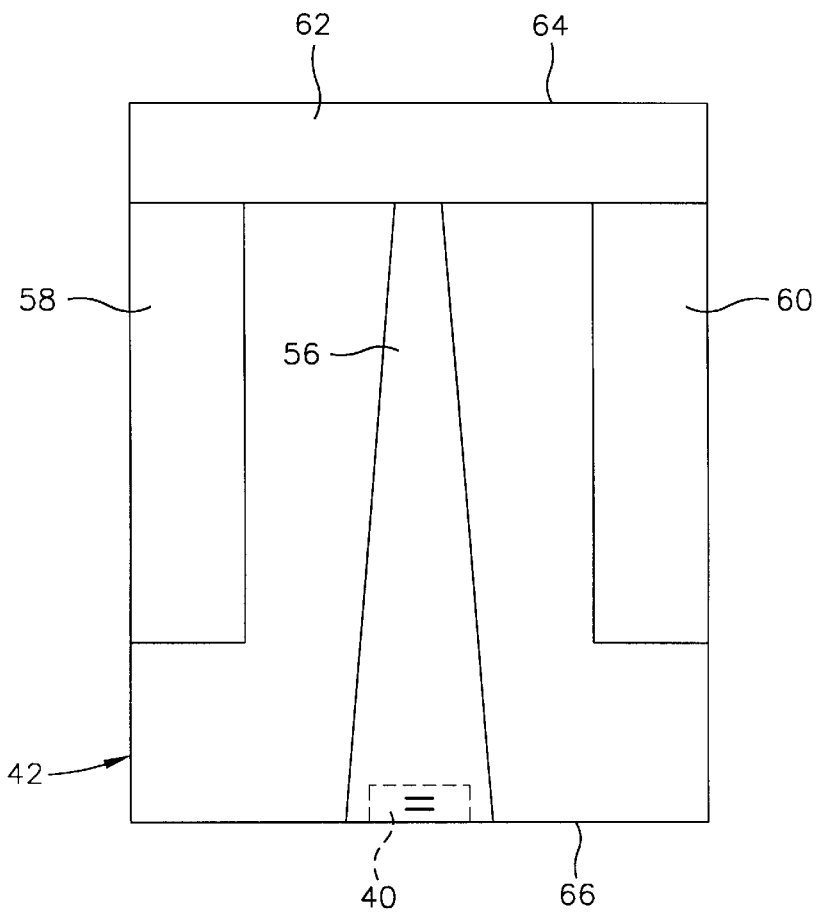
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
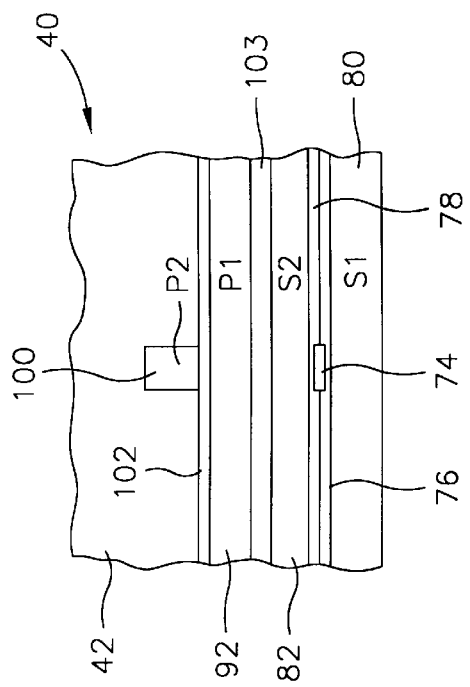
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_s$ conducted through the sensor causes these resistance changes to be manifested as potential changes. These potential changes are then processed as readback signals by the processing circuitry 50 shown in FIG. 3.

Figure 10:
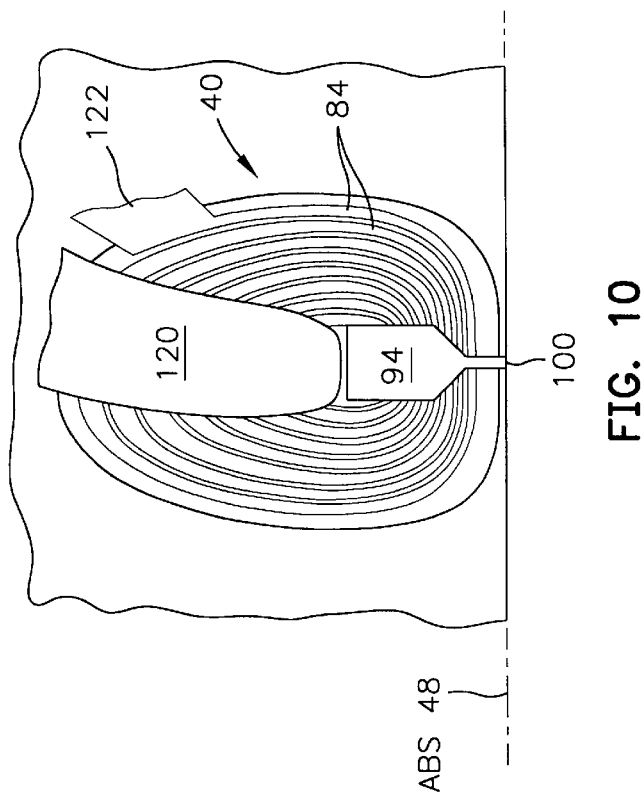
FIG. 10 is a view taken along plane 10—10 of FIG. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
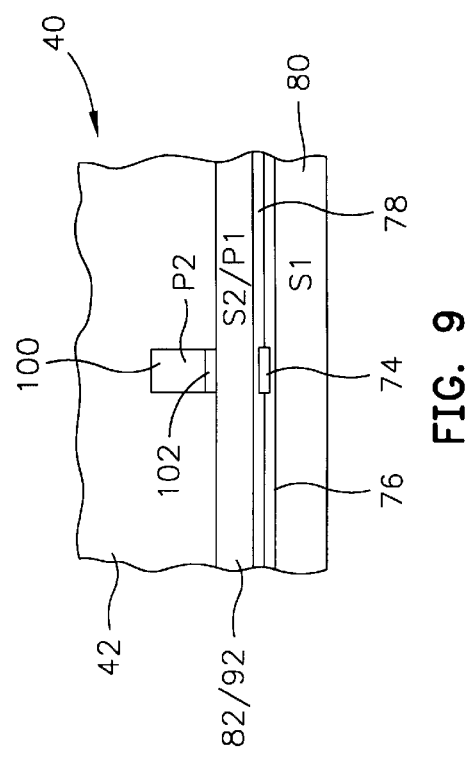
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
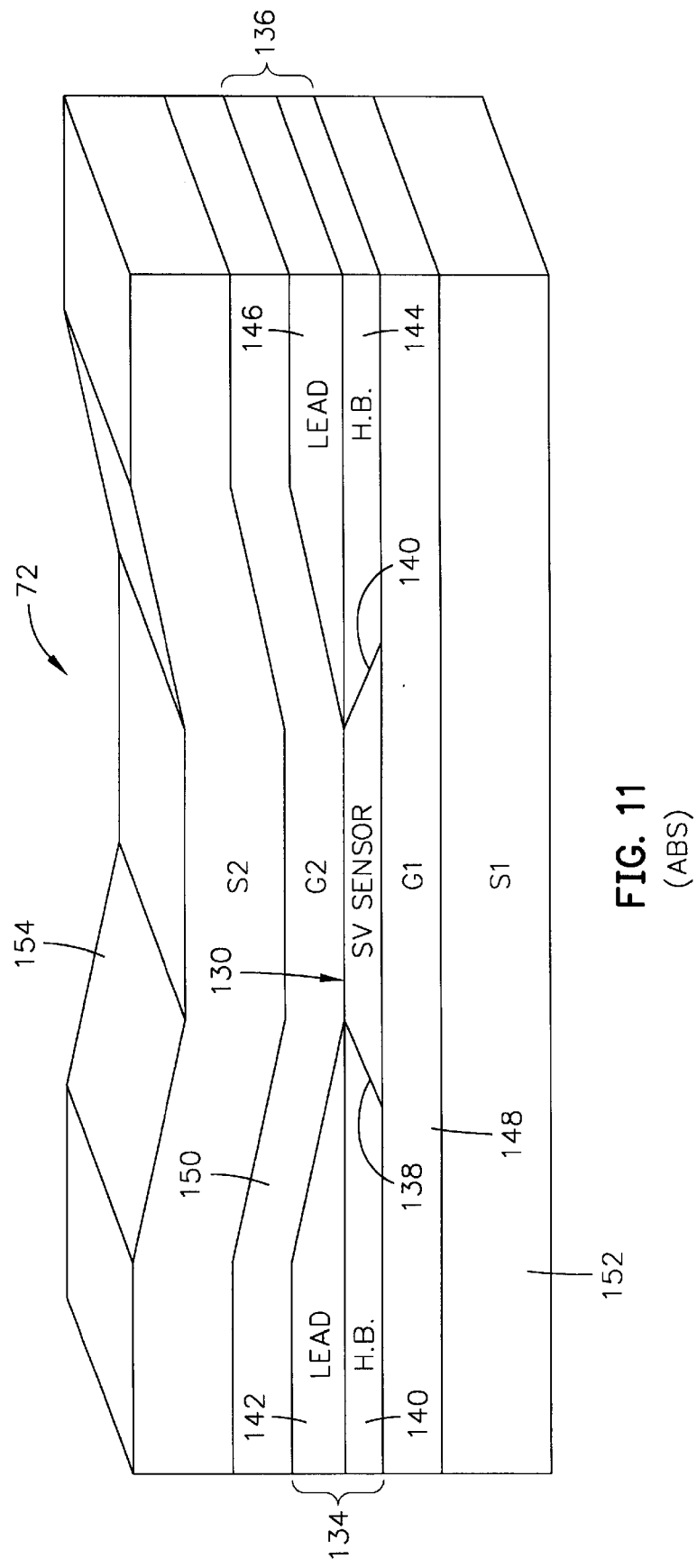
FIG. 11 is an enlarged isometric ABS illustration of a read head which has a spin valve sensor.

FIG. 11 is an isometric ABS illustration of the read head 72 shown in FIG. 6 or 8. The read head 72 includes the present spin valve sensor 130. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

The Invention

Figure 12:
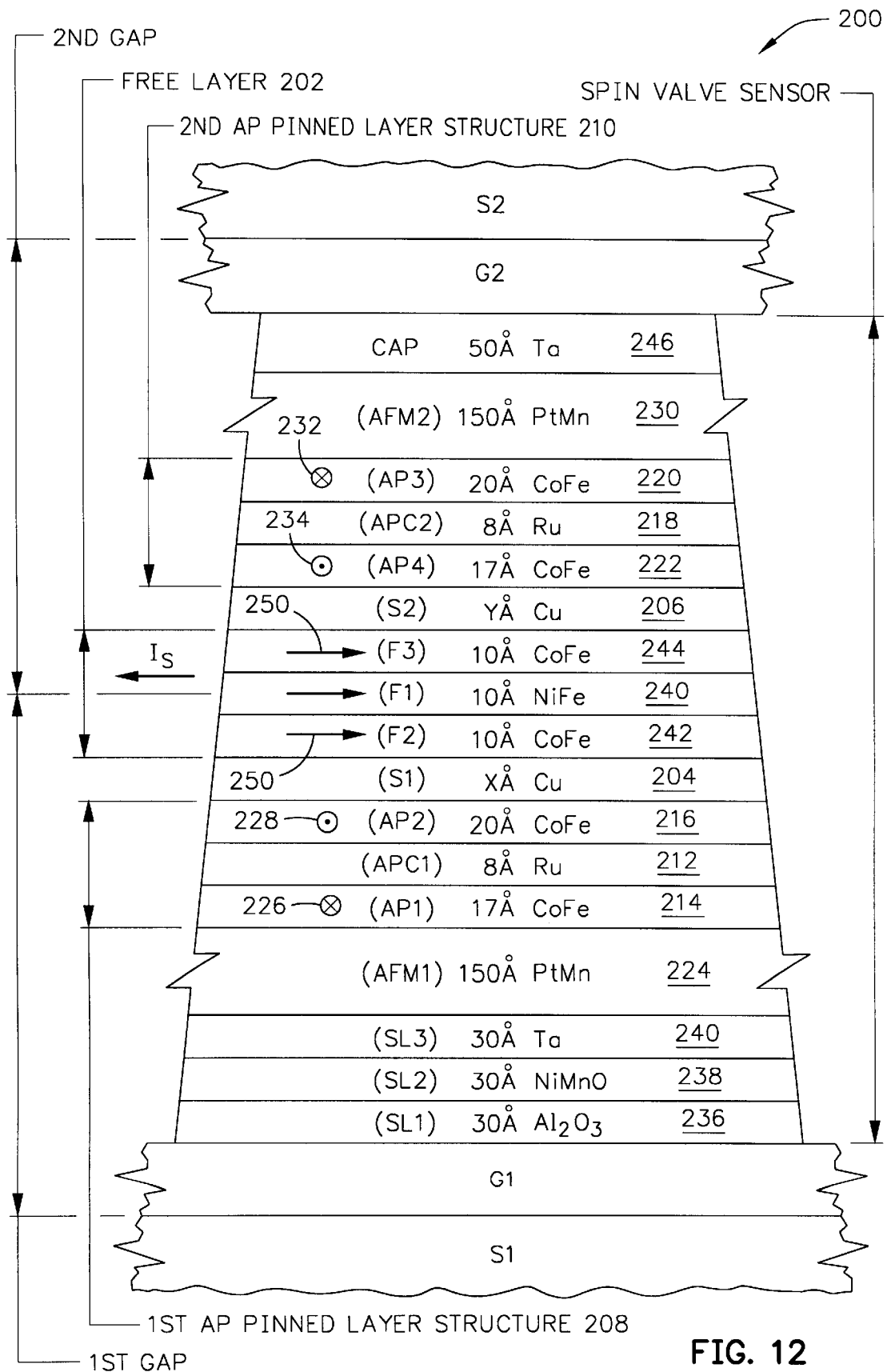
FIG. 12 is an ABS illustration of the present dual AP spin valve sensor.

FIG. 12 is an ABS illustration of the present dual AP pinned spin valve sensor 200. In this embodiment a free layer 202 is located between nonmagnetic conductive first and second spacer layers 204 and 206. The first and second spacer layers 204 and 206 are, in turn, located between first and second AP pinned layer structures 208 and 210. The first AP pinned layer structure 208 includes a first antiparallel coupling (APC1) layer 212 which is located between ferromagnetic first and second AP pinned layers (AP1) and (AP2) 214 and 216. The second AP pinned layer structure 210 includes a second antiparallel coupling (APC2) layer 218 which is located between ferromagnetic third and fourth AP pinned layers (AP3) and (AP4) 220 and 222.

A first antiferromagnetic (AFM1) pinning layer 224 is exchange coupled to the first AP pinned layer 214 for pinning a magnetic moment 226 of the first AP pinned film perpendicular to the ABS, such as into the head as shown in FIG. 12. By strong anti-parallel coupling between the AP pinned layers 214 and 216 the AP pinned layer 216 has a magnetic moment 228 which is antiparallel to the magnetic moment 226. A second antiferromagnetic (AFM2) pinning layer 230 is exchange coupled to the third AP pinned layer 220 for pinning a magnetic moment 232 of the third AP pinned layer perpendicular to the ABS and into the head, as shown in FIG. 12. Again, by a strong antiparallel coupling field between the third and fourth AP pinned layers 220 and 222 the fourth AP pinned layer 222 has a magnetic moment 234 which is antiparallel to the magnetic moment 232.

First, second and third seed layers (SL1), (SL2) and (SL3) 236, 238 and 240 are preferably provided for the first pinning layer 224 and a cap layer 242 may be provided on the third AP pinning layer 230. The free layer 202 may include a nickel iron (NiFe) film (F1) 240 which is located between first and second cobalt iron (CoFe) films (F2) and (F3) 242 and 244. It has been found that the cobalt iron (CoFe) films 242 and 244 between the nickel iron film 240 and the copper (Cu) spacer layers 204 and 206 increase the magnetoresistive coefficient dr/R.

Exemplary thicknesses and materials for the layers shown in FIG. 12 are 30 Å of aluminum oxide ($Al_2O_3$) for the first seed layer 236, 30 Å of nickel manganese oxide (NiMnO) for the second seed layer 238, 30 Å of tantalum (Ta) for the third seed layer 240, 150 Å of platinum manganese (PtMn) for the first pinning layer 224, 17 Å of cobalt iron(CoFe) for the first AP pinned layer 214, 8 Å of ruthenium (Ru) for the antiparallel coupling layer 212, 20 Å of cobalt iron (CoFe) for the second AP pinned layer 216, X Å of copper (Cu) for the first spacer layer 204, 10 Å of cobalt iron (CoFe) for the free film 242, 10 Å of nickel iron (NiFe) for the free film 240, 10 Å of cobalt iron (CoFe) for the free film 244, Y Å of copper (Cu) for the second spacer layer 206, 17 Å of cobalt iron (CoFe) for the fourth AP pinned layer 222, 8 Å of ruthenium (Ru) for the antiparallel coupling layer 218, 20 Å of cobalt iron (CoFe) for the third AP layer 220, 150 Å of platinum manganese (PtMn) for the second pinning layer 230, and 50 Å of tantalum (Ta) for the cap layer 246.

Figure 13:
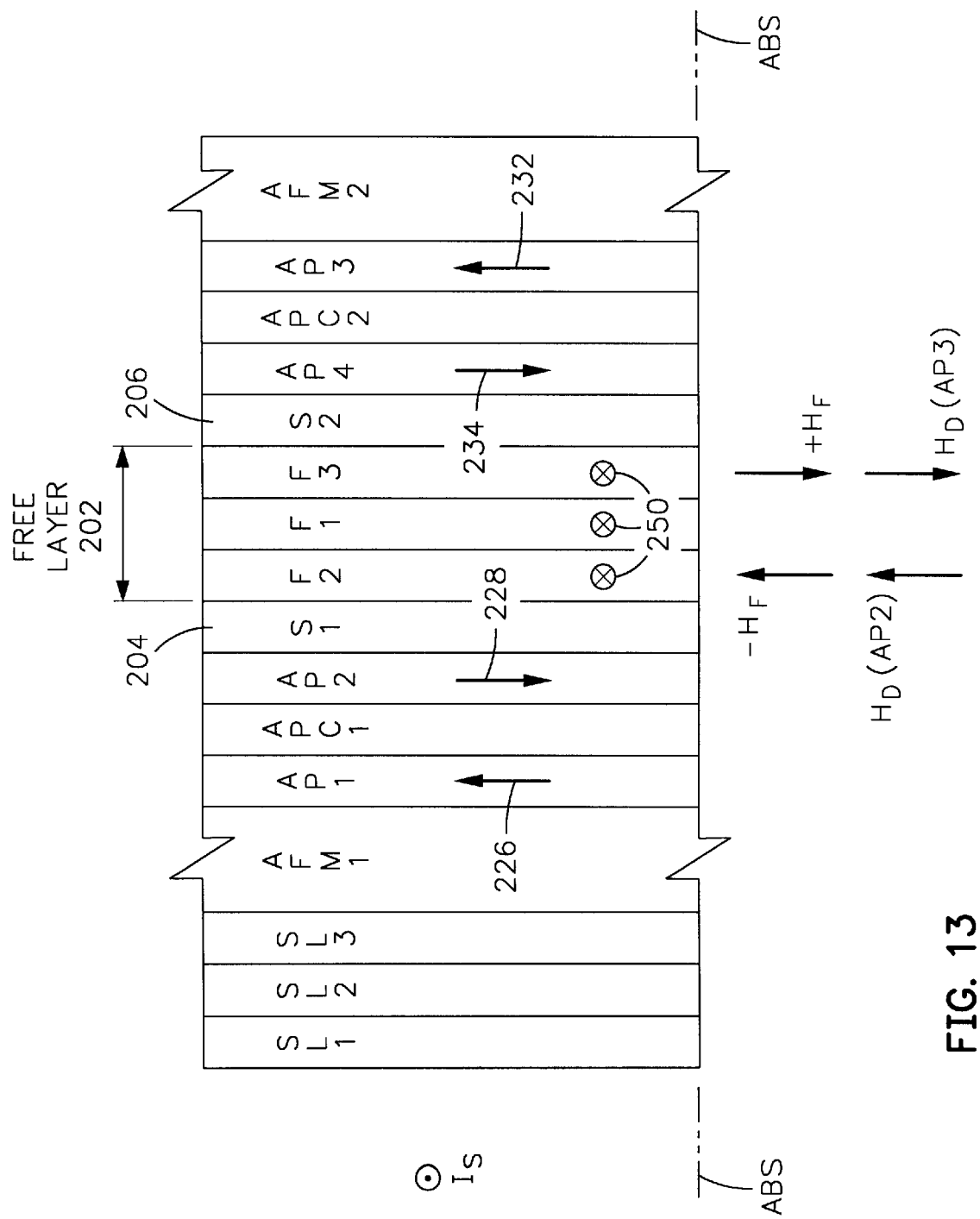
FIG. 13 is a side view of FIG. 12 rotated 90 degrees clockwise.
Figure 14:
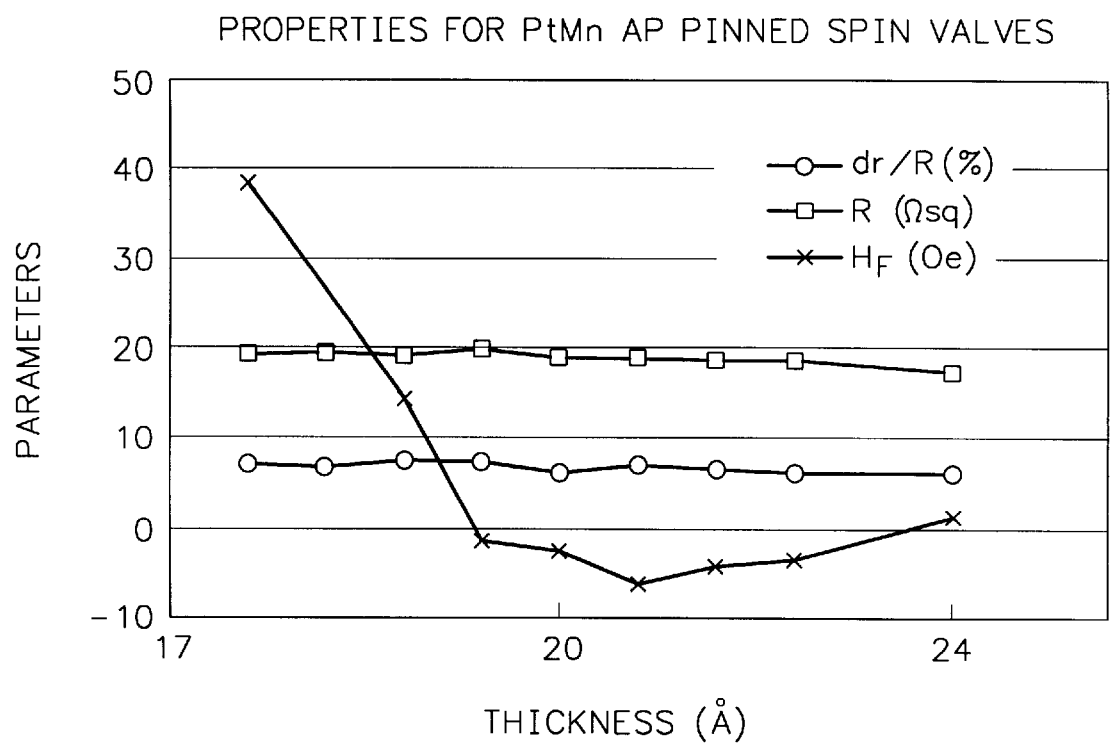
FIG. 14 is a graph of various parameters of a spin valve sensor versus thickness of the spacer layer.

FIG. 13 is a left side view of the spin valve sensor in FIG. 12 rotated 90° clockwise. It can be seen from FIG. 13 that there is a negative ferromagnetic coupling field $-H_F$ and a positive ferromagnetic coupling field $+H_F$. The ferromagnetic coupling field is negative when it goes in an opposite direction to the magnetic moment of the AP pinned layer next to the spacer layer, such as the magnetic moment 228 of the second AP pinned layer, and the ferromagnetic coupling field is positive when it goes in the same direction as the magnetic moment of the AP pinned layer next to the spacer layer, such as the magnetic moment 234 of the fourth AP pinned layer. The ferromagnetic coupling field $H_F$, the resistance R and the dr/R for a platinum manganese (PtMn) AP pinned spin valve with first, second and third seed layers 236, 238 and 240, shown in FIG. 12, for various thicknesses of a spacer layer are shown in FIG. 14. It can be seen that when the thickness of the spacer layer is between about 19.5 Å to 24 Å the ferromagnetic coupling field $H_F$ is negative. Accordingly, if the thickness X of the first spacer layer 204 in FIG. 12 is about 21 Å0 of copper (Cu) the ferromagnetic coupling field $H_F$ is approximately -7 Oe, and if the thickness Y of the spacer layer 206 is approximately 19 Å the ferro-magnetic coupling field $H_F$ is +7 Oe. With this type of arrangement the ferromagnetic coupling fields $-H_F$ and $+H_F$ in FIG. 13 can completely counterbalance each other.

With the thickness of the second AP pinned layer 216 greater than the thickness of the first AP pinned layer 214, and the thickness of the third AP pinned layer 220 thicker than the fourth AP pinned layer 222, the magnetic spins of the first and second pinning layers 224 and 230 can pin the magnetic moments 226 and 232 parallel with respect to one another, which causes the magnetic moments 228 and 234 to be parallel with respect to one another. When the magnetic moments 228 and 234 are parallel with respect to one another they are in-phase so that when the magnetic moment 250 of the free layer rotates from a parallel position with respect to the ABS the resistance changes of the sensor on each side of the free layer 202 are additive to increase the dr/R. It should be noted that since the second AP pinned layer 216 is thicker than the first AP pinned layer 214 the first AP pinned layer structure has a net demagnetizing field which enters the bottom of the free layer 202 at the ABS, and since the third AP pinned layer 220 is thicker than the fourth AP pinned layer 222 the second AP pinned layer structure has a demagnetizing field which enters the free layer at the top of the free layer. The demag $H_D$ (AP2) due to the thicker second AP pinned layer 216 is shown in FIG. 13 as being antiparallel to the demag $H_D$ (AP3) due to the thicker third AP pinned layer 220. When the thicknesses of the first and fourth AP pinned layers 214 and 222 are equal and the thicknesses of the second and third AP pinned layers 216 and 200 are equal the demagnetizing fields $H_D$ (AP2) and $H_D$ (AP3) will completely counterbalance each other.

It should be noted that when a current pulse is conducted through the sensor by the sense current circuit for $I_S$ (processing circuitry 50 in FIG. 3) in the same direction as $I_S$, shown in FIG. 13, that sense current fields from the conductive layers to the right of the second AP pinned layer (AP2) 216 will cause the magnetic moment 228 to be directed downwardly because it is a thicker layer and the magnetic moment 226 will be antiparallel thereto. The current pulse raises the temperature of the first pinning layer (AFM1) 224 sufficiently to permit its magnetic spins to orient themselves in the same direction as the magnetic moment 226. When the current pulse is terminated the pinning layer (AFM1) 224 cools and pins the magnetic moment 226 in the direction shown which, in turn, pins the magnetic moment 228 antiparallel thereto. The same holds true for the setting of the second pinning layer (AFM2) 230. When the current pulse fields from the conductive layers to the left of the second AP pinned layer structure the magnetic moment 232 of the third AP pinned layer (AP3) 220 is directed upwardly because it is a thicker layer and the magnetic moment 234 of the fourth AP pinned layer (AP4) is directed antiparallel thereto. When the second pinning layer (AFM2) 230 cools the magnetic moment 232 is set in the upwardly direction and by antiparallel coupling the magnetic moment 234 is directed downwardly. Accordingly, the thicknesses of the AP pinned layers permit setting of the first and second pinning layers (AFM1) and (AFM2) 224 and 230 by a current pulse through the sense current circuit directed in the same direction as the sense current $I_S$. The current pulse is generally three times the magnitude of the sense current $I_S$ and is on the order 0.9 mv. This arrangement is especially useful for setting the pinning layers after the read head is mounted on a magnetic disk drive. It should also be noted that the direction of the sense current $I_S$ supports the pinning of the magnetic moments 228 and 232 which, in turn, pins the magnetic moments 226 and 234.

Discussion

It should be understood that the thicknesses of the AP pinned layers can be reversed. For instance, the thickness of the first AP pinned layer 214 may be thicker than the second AP pinned layer 216 and the thickness of the fourth AP pinned layer 222 may be thicker than the third AP pinned layer 220. With this arrangement the magnetic moments 228 and 234 would be reversed in their directions and the magnetic moments 226 and 232 would be reversed in their directions. Also, with this arrangement the sense current $I_S$ would be directed into the paper in FIG. 13, instead of out of the paper, and the pulse current for resetting the pinning layers 224 and 230 would also be directed into the paper.

It should be understood that the thicknesses of the magnetic layers are to be considered as magnetic thicknesses. For instance, other materials can be employed for the ferromagnetic layers so long as the ferromagnetic thicknesses have the relationships discussed hereinabove. When the first gap layer (G1) is aluminum oxide ($Al_2O_3$) the first seed layer (SL1) 236 may be omitted. It should also be understood that the materials for the pinning layers 224 and 230 may be other than platinum manganese (PtMn), such as nickel manganese (NiMn), iridium manganese (IrMn) or iron manganese (FeMn). Each of these other materials will have their own graph or plot, similar to FIG. 14, for determining the appropriate thicknesses of the first and second spacer layers 204 and 206. It should be noted that the sense current fields due to the conductive layers on each side of the free layer 202 in FIGS. 12 and 13 will essentially completely counterbalance each other so that the net sense current field acting on the free layer 202 is virtually zero. In a preferred embodiment the first and second gaps, as shown in FIG. 12, are equal which means that the distance between the center ofthe free layer to each ofthe first and second shield layers (S1) and (S2) are equal. With this arrangement image current fields from the first and second shield layers (S1) and (S2) will be equal so as to counterbalance each other. Further, by centering the free layer 202 between the first and second shield layers (S1) and (S2) the total gap of the read head, which is equal to the combination of the first and second gaps, can be minimized for promoting linear read bit density ofthe read head. The cobalt iron layers are preferably $Co_{90}Fe_{10}$, the nickel iron layers are preferably $Ni_{89}Fe_{21}$, and the platinum manganese layers are preferably $Pt_{50}Mn_{50}$. It should be understood that percentages of the elements of these materials can be varied as desired and that cobalt (Co) could be substituted for the cobalt iron (CoFe) layers. The dual AP pinned spin valve sensor 200 in FIGS. 12 and 13 may be employed in place of the spin valve sensor 130 in FIG. 11 and used in the magnetic disk drive shown in FIGS. 1–5.

Clearly, other embodiments and modifications ofthis invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head, which has an air bearing surface (ABS), comprising:
   a dual spin valve sensor including:
      antiferromagnetic first and second pinning layers;
      ferromagnetic first and second antiparallel (AP) pinned layer structures located between the first and second pinning layers with a first side of the first AP pinned layer structure interfacing the first pinning layer and a first side of the second AP pinned layer structure interfacing the second pinning layer so that the first AP pinned layer structure has a net magnetic moment oriented perpendicular to the air bearing surface and the second AP pinned layer structure has a net magnetic moment oriented antiparallel to the net magnetic moment of the first AP pinned layer structure;
      nonmagnetic electrically conductive first and second spacer layers located between the first and second AP pinned layer structures with a first side of the first spacer layer interfacing a second side of the first AP pinned layer structure and a first side of the second spacer layer interfacing a second side of the second AP pinned layer structure;
      a ferromagnetic free layer located between the first and second spacer layers with a first side of the free layer interfacing a second side of the first spacer layer and a second side of the free layer interfacing a second side of the second spacer layer;
      the net magnetic moment of the first AP pinned layer structure causing a demagnetizing field on the free layer which is oriented in a direction perpendicular to the air bearing surface and the net magnetic moment of the second AP pinned layer structure causing a demagnetizing field on the free layer which is oriented in a direction which is antiparallel to the demagnetizing field of the first AP pinned layer; and
      the first AP pinned layer structure exerting a ferromagnetic coupling field on the free layer which is oriented perpendicular to the air bearing surface and the second AP pinned layer structure exerting a ferromagnetic coupling field on the free layer which is oriented antiparallel to the ferromagnetic coupling field of the first AP pinned layer structure.

2. A magnetic read head as claimed in claim 1 including:
   ferromagnetic first and second shield layers;
   nonmagnetic and insulative first and second read gap layers located between the first and second shield layers; and
   the spin valve sensor being located between the first and second read gap layers.

3. A magnetic read head as claimed in claim 2 including:
   the first AP pinned layer structure having a first antiparallel coupling (APC) layer and first and second antiparallel (AP) pinned layers with the first APC layer located between the first and second AP pinned layers;
   the second AP pinned layer structure having a second antiparallel coupling (APC) layer and third and fourth antiparallel (AP) pinned layers with the second APC layer located between the third and fourth AP pinned layers;
   the first AP pinned layer having said first side of the first AP pinned layer structure, the second AP pinned layer having said second side of the first AP pinned layer structure, the third AP pinned layer having said second side of the second AP pinned layer structure and the fourth AP pinned layer having said first side of the second AP pinned layer structure; and
   the second AP pinned layer having a magnetic thickness which is greater than a magnetic thickness of the first AP pinned layer and the fourth AP pinned layer having a magnetic thickness that is greater than a magnetic thickness of the third AP pinned layer.

4. A magnetic read head as claimed in claim 2 including:
   the first AP pinned layer structure having a first antiparallel coupling (APC) layer and first and second antiparallel (AP) pinned layers with the first APC layer located between the first and second AP pinned layers;
   the second AP pinned layer structure having a second antiparallel coupling (APC) layer and third and fourth antiparallel (AP) pinned layers with the second APC layer located between the third and fourth AP pinned layers;
   the first AP pinned layer having said first side of the first AP pinned layer structure, the second AP pinned layer having said second side of the first AP pinned layer structure, the third AP pinned layer having said second side of the second AP pinned layer structure and the fourth AP pinned layer having said first side of the second AP pinned layer structure; and
   the first AP pinned layer having a magnetic thickness which is greater than a magnetic thickness of the second AP pinned layer and the third AP pinned layer having a magnetic thickness that is greater than a magnetic thickness of the fourth AP pinned layer.

5. A magnetic read head as claimed in claim 2 further comprising:
   the first AP pinned layer structure having a first antiparallel coupling (APC) layer and first and second antiparallel (AP) pinned layers with the first APC layer located between the first and second AP pinned layers;
   the second AP pinned layer structure having a second antiparallel coupling (APC) layer and third and fourth antiparallel (AP) pinned layers with the second APC layer located between the third and fourth AP pinned layers;

the first AP pinned layer having said first side of the first AP pinned layer structure, the second AP pinned layer having said second side of the first AP pinned layer structure, the third AP pinned layer having said second side of the second AP pinned layer structure and the fourth AP pinned layer having said first side of the second AP pinned layer structure; and the magnetic thicknesses of the first and fourth AP pinned layers being equal and the magnetic thicknesses of the second and third AP pinned layers being equal.

6. A magnetic read head as claimed in claim 2 wherein the first spacer layer has a thickness that is greater than a thickness of the second spacer layer.

7. A magnetic read head as claimed in claim 6 wherein the demagnetizing field of the first AP pinned layer structure is equal to the demagnetizing field of the second AP pinned layer structure.

8. A magnetic read head as claimed in claim 7 further comprising:

the first AP pinned layer structure having a first antiparallel coupling (APC) layer and first and second antiparallel (AP) pinned layers with the first APC layer located between the first and second AP pinned layers;

the second AP pinned layer structure having a second antiparalel coupling (APC) layer and third and fourth antiparallel (AP) pinned layers with the second APC layer located between the third and fourth AP pinned layers;

the first AP pinned layer having said first side of the first AP pinned layer structure, the second AP pinned layer having said second side of the first AP pinned layer structure, the third AP pinned layer having said second side of the second AP pinned layer structure and the fourth AP pinned layer having said first side of the second AP pinned layer structure; and the magnetic thicknesses of the first and fourth AP pinned layers being equal and the magnetic thicknesses of the second and third AP pinned layers being equal.

9. A magnetic read head, which has an air bearing surface (ABS), comprising:

ferromagnetic first and second shield layers;

nonmagnetic and insulative first and second read gap layers located between the first and second shield layers; and a dual spin valve sensor being located between the first and second read gap layers;

the dual spin valve sensor including:

antiferromagnetic first and second pinning layers;

ferromagnetic first and second antiparallel (AP) pinned layer structures located between the first and second pinning layers with a first side of the first AP pinned layer structure interfacing the first pinning layer and a first side of the second AP pinned layer structure interfacing the second pinning layer structure so that the first AP pinned layer structure has a net magnetic moment oriented perpendicular to the air bearing surface and the second AP pinned layer structure has a net magnetic moment oriented antiparallel to the net magnetic moment of the first AP pinned layer structure;

nonmagnetic electrically conductive first and second spacer layers located between the first and second AP pinned layer structures with a first side of the first spacer layer interfacing a second side of the first AP pinned layer structure and a first side of the second spacer layer interfacing a second side of the second AP pinned layer structure;

the first spacer layer having a thickness that is greater than a thickness of the second spacer layer;

a ferromagnetic free layer located between the first and second spacer layers with a first side of the free layer interfacing a second side of the first spacer layer and a second side of the free layer interfacing a second side of the second spacer layer;

the free layer being centered between the first and second shield layers so that image current fields from the first and second shield layers on the free layer counterbalance each other resulting in a net image current field of zero;

the net magnetic moment of the first AP pinned layer structure causing a demagnetizing field on the free layer which is oriented in a direction perpendicular to the air bearing surface and the net magnetic moment of the second AP pinned layer structure causing a demagnetizing field on the free layer which is oriented in a direction which is antiparallel to the demagnetizing field of the first AP pinned layer;

the first AP pinned layer structure exerting a ferromagnetic coupling field on the free layer which is oriented perpendicular to the air bearing surface and the second AP pinned layer structure exerting a ferromagnetic coupling field on the free layer which is oriented antiparallel to the ferromagnetic coupling field of the first AP pinned layer structure;

the demagnetizing field of the first AP pinned layer structure being equal to the demagnetizing field of the second AP pinned layer structure;

the first AP pinned layer structure having a first antiparallel coupling (APC) layer and first and second antiparallel (AP) pinned layers with the first APC layer located between the first and second AP pinned layers;

the second AP pinned layer structure having a second antiparallel coupling (APC) layer and third and fourth antiparallel (AP) pinned layers with the second APC layer located between the third and fourth AP pinned layers;

the first AP pinned layer having said first side in the first AP pinned layer structure, the second AP pinned layer having said second side in the first AP pinned layer structure, the third AP pinned layer having said second side in the second AP pinned layer structure and the fourth AP pinned layer having said first side in the second AP pinned layer structure;

the second AP pinned layer having a magnetic thickness which is greater than a magnetic thickness of the first AP pinned layer and the fourth AP pinned layer having a magnetic thickness that is greater than a magnetic thickness of the third AP pinned layer; and the magnetic thicknesses of the second and fourth AP pinned layers being equal and the magnetic thicknesses of the first and third AP pinned layers being equal.

10. A magnetic read head as claimed in claim 9 including:

each of the first and second pinning layers being composed of platinum manganese (PtMn); and a first seed layer composed of aluminum oxide ($Al_2O_3$), a second seed layer composed of nickel manganese oxide (NiMnO) and a third seed layer composed of tantalum (Ta) with the second seed layer located between the first and third seed layers and the first pinning layer interfacing the third seed layer.

11. A magnetic head assembly comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
a read head including:
nonmagnetic nonconductive first and second read gap layers;
a dual spin valve sensor located between the first and second read gap layers;
ferromagnetic first and second shield layers; and
the first and second read gap layers being located between the first and second shield layers with the first read gap layer interfacing the first shield layer and the second read gap layer interfacing the second shield layer;
the dual spin valve sensor including:
antiferromagnetic first and second pinning layers;
ferromagnetic first and second antiparallel (AP) pinned layer structures located between the first and second pinning layers with a first side of the first AP pinned layer structure interfacing the first pinning layer and a first side of the second AP pinned layer structure interfacing the second pinning layer so that the first AP pinned layer structure has a net magnetic moment oriented perpendicular to the air bearing surface and the second AP pinned layer structure has a net magnetic moment oriented antiparallel to the net magnetic moment of the first AP pinned layer structure;
nonmagnetic electrically conductive first and second spacer layers located between the first and second AP pinned layer structures with a first side of the first spacer layer interfacing a second side of the first AP pinned layer structure and a first side of the second spacer layer interfacing a second side of the second AP pinned layer structure;
a ferromagnetic free layer located between the first and second spacer layers with a first side of the free layer interfacing a second side of the first spacer layer and a second side of the free layer interfacing a second side of the second spacer layer;
the net magnetic moment of the first AP pinned layer structure causing a demagnetizing field on the free layer which is oriented in a direction perpendicular to the air bearing surface and the net magnetic moment of the second AP pinned layer structure causing a demagnetizing field on the free layer which is oriented in a direction which is antiparallel to the demagnetizing field of the first AP pinned layer; and
the first AP pinned layer structure exerting a ferromagnetic coupling field on the free layer which is oriented perpendicular to the air bearing surface and the second AP pinned layer structure exerting a ferromagnetic coupling field on the free layer which is oriented antiparallel to the ferromagnetic coupling field of the first AP pinned layer structure.

12. A magnetic head assembly as claimed in claim 11 wherein the first pole layer and the second shield layer are a common layer.

13. A magnetic head assembly as claimed in claim 11 including a nonmagnetic isolation layer located between the second shield layer and the first pole piece layer.

14. A magnetic head assembly as claimed in claim 11 including:
the first AP pinned layer structure having a first antiparallel coupling (APC) layer and first and second antiparallel (AP) pinned layers with the first APC layer located between the first and second AP pinned layers;
the second AP pinned layer structure having a second antiparallel coupling (APC) layer and third and fourth antiparallel (AP) pinned layers with the second APC layer located between the third and fourth AP pinned layers;
the first AP pinned layer having said first side of the first AP pinned layer structure, the second AP pinned layer having said second side of the first AP pinned layer structure, the third AP pinned layer having said second side of the second AP pinned layer structure and the fourth AP pinned layer having said first side of the second AP pinned layer structure; and
the second AP pinned layer having a magnetic thickness which is greater than a magnetic thickness of the first AP pinned layer and the fourth AP pinned layer having a magnetic thickness that is greater than a magnetic thickness of the third AP pinned layer.

15. A magnetic head assembly as claimed in claim 11 including:
the first AP pinned layer structure having a first antiparallel coupling (APC) layer and first and second antiparallel (AP) pinned layers with the first APC layer located between the first and second AP pinned layers;
the second AP pinned layer structure having a second antiparallel coupling (APC) layer and third and fourth antiparallel (AP) pinned layers with the second APC layer located between the third and fourth AP pinned layers;
the first AP pinned layer having said first side of the first AP pinned layer structure, the second AP pinned layer having said second side of the first AP pinned layer structure, the third AP pinned layer having said second side of the second AP pinned layer structure and the fourth AP pinned layer having said first side of the second AP pinned layer structure; and
the first AP pinned layer having a magnetic thickness which is greater than a magnetic thickness of the second AP pinned layer and the third AP pinned layer having a magnetic thickness that is greater than a magnetic thickness of the fourth AP pinned layer.

16. A magnetic head assembly as claimed in claim 11 further comprising:
the first AP pinned layer structure having a first antiparallel coupling (APC) layer and first and second antiparallel (AP) pinned layers with the first APC layer located between the first and second AP pinned layers;
the second AP pinned layer structure having a second antiparallel coupling (APC) layer and third and fourth antiparallel (AP) pinned layers with the second APC layer located between the third and fourth AP pinned layers;
the first AP pinned layer having said first side of the first AP pinned layer structure, the second AP pinned layer having said second side of the first AP pinned layer structure, the third AP pinned layer having said second side of the second AP pinned layer structure and the fourth AP pinned layer having said first side of the second AP pinned layer structure; and the magnetic thicknesses of the first and fourth AP pinned layers being equal and the magnetic thicknesses of the second and third AP pinned layers being equal.

17. A magnetic head assembly as claimed in claim 11 wherein the first spacer layer has a thickness that is greater than a thickness of the second spacer layer.

18. A magnetic head assembly as claimed in claim 17 wherein the demagnetizing field of the first AP pinned layer structure is equal to the demagnetizing field of the second AP pinned layer structure.

19. A magnetic head assembly as claimed in claim 18 further comprising:

the first AP pinned layer structure having a first antiparallel coupling (APC) layer and first and second antiparallel (AP) pinned layers with the first APC layer located between the first and second AP pinned layers;

the second AP pinned layer structure having a second antiparallel coupling (APC) layer and third and fourth antiparallel (AP) pinned layers with the second APC layer located between the third and fourth AP pinned layers;

the first AP pinned layer having said first side of the first AP pinned layer structure, the second AP pinned layer having said second side of the first AP pinned layer structure, the third AP pinned layer having said second side of the second AP pinned layer structure and the fourth AP pinned layer having said first side of the second AP pinned layer structure; and the magnetic thicknesses of the first and fourth AP pinned layers being equal and the magnetic thicknesses of the second and third AP pinned layers being equal.

20. A magnetic head assembly comprising:

a write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; and a read head including:

nonmagnetic nonconductive first and second read gap layers;

a dual spin valve sensor located between the first and second read gap layers;

ferromagnetic first and second shield layers; and the first and second read gap layers being located between the first and second shield layers with the first read gap layer interfacing the first shield layer and the second read gap layer interfacing the second shield layer;

the dual spin valve sensor including:

antiferromagnetic first and second pinning layers;

ferromagnetic first and second antiparallel (AP) pinned layer structures located between the first and second pinning layers with a first side of the first AP pinned layer structure interfacing the first pinning layer and a first side of the second AP pinned layer structure interfacing the second pinning layer so that the first AP pinned layer structure has a net magnetic moment oriented perpendicular to the air bearing surface and the second AP pinned layer structure has a net magnetic moment oriented antiparallel to the net magnetic moment of the first AP pinned layer structure;

nonmagnetic electrically conductive first and second spacer layers located between the first and second AP pinned layer structures with a first side of the first spacer layer interfacing a second side of the first AP pinned layer structure and a first side of the second spacer layer interfacing a second side of the second AP pinned layer structure;

the first spacer layer having a thickness that is greater than a thickness of the second spacer layer;

a ferromagnetic free layer located between the first and second spacer layers with a first side of the free layer interfacing a second side of the first spacer layer and a second side of the free layer interfacing a second side of the second spacer layer;

the free layer being centered between the first and second shield layers so that image current fields from the first and second shield layers on the free layer counterbalance each other resulting in a net image current field of zero;

the net magnetic moment of the first AP pinned layer structure causing a demagnetizing field on the free layer which is oriented in a direction perpendicular to the air bearing surface and the net magnetic moment of the second AP pinned layer structure causing a demagnetizing field on the free layer which is oriented in a direction which is antiparallel to the demagnetizing field of the first AP pinned layer structure;

the first AP pinned layer structure exerting a ferromagnetic coupling field on the free layer which is oriented perpendicular to the air bearing surface and the second AP pinned layer structure exerting a ferromagnetic coupling field on the free layer which is oriented antiparallel to the ferromagnetic coupling field of the first AP pinned layer structure;

the demagnetizing field of the first AP pinned layer structure being equal to the demagnetizing field of the second AP pinned layer structure;

the first AP pinned layer structure having a first antiparallel coupling (APC) layer and first and second antiparallel (AP) pinned layers with the first APC layer located between the first and second AP pinned layers;

the second AP pinned layer structure having a second antiparallel coupling (APC) layer and third and fourth antiparallel (AP) pinned layers with the second APC layer located between the third and fourth AP pinned layers;

the first AP pinned layer having said first side in the first AP pinned layer structure, the second AP pinned layer having said second side in the first AP pinned layer structure, the third AP pinned layer having said second side in the second AP pinned layer structure and the fourth AP pinned layer having said first side in the second AP pinned layer structure;

the second AP pinned layer having a magnetic thickness which is greater than a magnetic thickness of the first AP pinned layer and the fourth AP pinned layer having a magnetic thickness that is greater than a magnetic thickness of the third AP pinned layer; and the magnetic thicknesses of the second and fourth AP pinned layers being equal and the magnetic thicknesses of the first and third AP pinned layers being equal.

21. A magnetic head assembly as claimed in claim 20 including:
  each of the first and second pinning layers being composed of platinum manganese (PtMn); and
  a first seed layer composed of aluminum oxide ($Al_2O_3$), a second seed layer composed of nickel manganese oxide (NiMnO) and a third seed layer composed of tantalum (Ta) with the second seed layer located between the first and third seed layers and the first pinning layer interfacing the third seed layer.

22. A magnetic disk drive including at least one magnetic head assembly that includes a write head and a read head and has an air bearing surface, comprising:
  the write head including:
    ferromagnetic first and second pole piece layers that have a yoke portion located between a pole tip portion and a back gap portion;
    a nonmagnetic write gap layer located between the pole tip portions of the first and second pole piece layers;
    an insulation stack with at least one coil layer embedded therein located between the yoke portions of the first and second pole piece layers; and
    the first and second pole piece layers being connected at their back gap portions; and
  the read head including:
    nonmagnetic nonconductive first and second read gap layers;
    a dual spin valve sensor located between the first and second read gap layers;
    ferromagnetic first and second shield layers; and
    the first and second read gap layers being located between the first and second shield layers with the first read gap layer interfacing the first shield layer and the second read gap layer interfacing the second shield layer;
  the dual spin valve sensor including:
    antiferromagnetic first and second pinning layers;
    ferromagnetic first and second antiparallel (AP) pinned layer structures located between the first and second pinning layers with a first side of the first AP pinned layer structure interfacing the first pinning layer and a first side of the second AP pinned layer structure interfacing the second pinning layer so that the first AP pinned layer structure has a net magnetic moment oriented perpendicular to the air bearing surface and the second AP pinned layer structure has a net magnetic moment oriented antiparallel to the net magnetic moment of the first AP pinned layer structure;
    nonmagnetic electrically conductive first and second spacer layers located between the first and second AP pinned layer structures with a first side of the first spacer layer interfacing a second side of the first AP pinned layer structure and a first side of the second spacer layer interfacing a second side of the second AP pinned layer structure;
    a ferromagnetic free layer located between the first and second spacer layers with a first side of the free layer interfacing a second side of the first spacer layer and a second side of the free layer interfacing a second side of the second spacer layer;
    the net magnetic moment of the first AP pinned layer structure causing a demagnetizing field on the free layer which is oriented in a direction perpendicular to the air bearing surface and the net magnetic moment of the second AP pinned layer structure causing a demagnetizing field on the free layer which is oriented in a direction which is antiparallel to the demagnetizing field of the first AP pinned layer; and
    the first AP pinned layer structure exerting a ferromagnetic coupling field on the free layer which is oriented perpendicular to the air bearing surface and the second AP pinned layer structure exerting a ferromagnetic coupling field on the free layer which is oriented antiparallel to the ferromagnetic coupling field of the first AP pinned layer structure;
  a housing;
  a magnetic disk rotatably supported in the housing;
  a support mounted in the housing for supporting the magnetic head assembly with said air bearing surface facing the magnetic disk so that the magnetic head assembly is in a transducing relationship with the magnetic disk;
  a spindle motor for rotating the magnetic disk;
  an actuator positioning means connected to the support for moving the magnetic head assembly to multiple positions with respect to said magnetic disk; and
  a processor connected to the magnetic head assembly, to the spindle motor and to the actuator for exchanging signals with the magnetic head assembly, for controlling movement of the magnetic disk and for controlling the position of the magnetic head assembly.

23. A magnetic disk drive as claimed in claim 22 wherein the first pole layer and the second shield layer are a common layer.

24. A magnetic disk drive as claimed in claim 22 including a nonmagnetic isolation layer located between the second shield layer and the first pole piece layer.

25. A magnetic disk drive as claimed in claim 22 including:
  the first AP pinned layer structure having a first antiparallel coupling (APC) layer and first and second antiparallel (AP) pinned layers with the first APC layer located between the first and second AP pinned layers;
  the second AP pinned layer structure having a second antiparallel coupling (APC) layer and third and fourth antiparallel (AP) pinned layers with the second APC layer located between the third and fourth AP pinned layers;
  the first AP pinned layer having said first side of the first AP pinned layer structure, the second AP pinned layer having said second side of the first AP pinned layer structure, the third AP pinned layer having said second side of the second AP pinned layer structure and the fourth AP pinned layer having said first side of the second AP pinned layer structure; and
  the second AP pinned layer having a magnetic thickness which is greater than a magnetic thickness of the first AP pinned layer and the fourth AP pinned layer having a magnetic thickness that is greater than a magnetic thickness of the third AP pinned layer.

26. A magnetic disk drive as claimed in claim 22 including:
  the first AP pinned layer structure having a first antiparallel coupling (APC) layer and first and second antiparallel (AP) pinned layers with the first APC layer located between the first and second AP pinned layers;
  the second AP pinned layer structure having a second antiparallel coupling (APC) layer and third and fourth antiparallel (AP) pinned layers with the second APC layer located between the third and fourth AP pinned layers;

the first AP pinned layer having said first side of the first AP pinned layer structure, the second AP pinned layer having said second side of the first AP pinned layer structure, the third AP pinned layer having said second side of the second AP pinned layer structure and the fourth AP pinned layer having said first side of the second AP pinned layer structure; and the first AP pinned layer having a magnetic thickness which is greater than a magnetic thickness of the second AP pinned layer and the third AP pinned layer having a magnetic thickness that is greater than a magnetic thickness of the fourth AP pinned layer.

27. A magnetic disk drive as claimed in claim 22 further comprising:

the first AP pinned layer structure having a first antiparallel coupling (APC) layer and first and second antiparallel (AP) pinned layers with the first APC layer located between the first and second AP pinned layers;

the second AP pinned layer structure having a second antiparallel coupling (APC) layer and third and fourth antiparallel (AP) pinned layers with the second APC layer located between the third and fourth AP pinned layers;

the first AP pinned layer having said first side of the first AP pinned layer structure, the second AP pinned layer having said second side of the first AP pinned layer structure, the third AP pinned layer having said second side of the second AP pinned layer structure and the fourth AP pinned layer having said first side of the second AP pinned layer structure; and the magnetic thicknesses of the first and fourth AP pinned layers being equal and the magnetic thicknesses of the second and third AP pinned layers being equal.

28. A magnetic disk drive as claimed in claim 22 wherein the first spacer layer has a thickness that is greater than a thickness of the second spacer layer.

29. A magnetic disk drive as claimed in claim 28 wherein the demagnetizing field of the first AP pinned layer structure is equal to the demagnetizing field of the second AP pinned layer structure.

30. A magnetic disk drive as claimed in claim 29 further comprising:

the first AP pinned layer structure having a first antiparallel coupling (APC) layer and first and second antiparallel (AP) pinned layers with the first APC layer located between the first and second AP pinned layers;

the second AP pinned layer structure having a second antiparallel coupling (APC) layer and third and fourth antiparallel (AP) pinned layers with the second APC layer located between the third and fourth AP pinned layers;

the first AP pinned layer having said first side of the first AP pinned layer structure, the second AP pinned layer having said second side of the first AP pinned layer structure, the third AP pinned layer having said second side of the second AP pinned layer structure and the fourth AP pinned layer having said first side of the second AP pinned layer structure; and the magnetic thicknesses of the first and fourth AP pinned layers being equal and the magnetic thicknesses of the second and third AP pinned layers being equal.

31. A magnetic disk drive including at least one magnetic head assembly that includes a write head and a read head and has an air bearing surface, comprising:

the write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; and the read head including:

nonmagnetic nonconductive first and second read gap layers;

a dual spin valve sensor located between the first and second read gap layers;

ferromagnetic first and second shield layers; and the first and second read gap layers being located between the first and second shield layers with the first read gap layer interfacing the first shield layer and the second read gap layer interfacing the second shield layer;

the dual spin valve sensor including:

antiferromagnetic first and second pinning layers;

ferromagnetic first and second antiparallel (AP) pinned layer structures located between the first and second pinning layers with a first side of the first AP pinned layer structure interfacing the first pinning layer and a first side of the second AP pinned layer structure interfacing the second pinning layer so that the first AP pinned layer structure has a net magnetic moment oriented perpendicular to the air bearing surface and the second AP pinned layer structure has a net magnetic moment oriented antiparallel to the net magnetic moment of the first AP pinned layer structure;

nonmagnetic electrically conductive first and second spacer layers located between the first and second AP pinned layer structures with a first side of the first spacer layer interfacing a second side of the first AP pinned layer structure and a first side of the second spacer layer interfacing a second side of the second AP pinned layer structure;

the first spacer layer having a thickness that is greater than a thickness of the second spacer layer;

a ferromagnetic free layer located between the first and second spacer layers with a first side of the free layer interfacing a second side of the first spacer layer and a second side of the free layer interfacing a second side of the second spacer layer;

the free layer being centered between the first and second shield layers so that image current fields from the first and second shield layers on the free layer counterbalance each other resulting in a net image current field of zero;

the net magnetic moment of the first AP pinned layer structure causing a demagnetizing field on the free layer which is oriented in a direction perpendicular to the air bearing surface and the net magnetic moment of the second AP pinned layer structure causing a demagnetizing field on the free layer which is oriented in a direction which is antiparallel to the demagnetizing field of the first AP pinned layer; and the first AP pinned layer structure exerting a ferromagnetic coupling field on the free layer which is oriented perpendicular to the air bearing surface and the second AP pinned layer structure exerting a ferromagnetic coupling field on the free layer which is oriented antiparallel to the ferromagnetic coupling field of the first AP pinned layer structure;

the demagnetizing field of the first AP pinned layer structure being equal to the demagnetizing field of the second AP pinned layer structure;

the first AP pinned layer structure having a first antiparallel coupling (APC) layer and first and second antiparallel (AP) pinned layers with the first APC layer located between the first and second AP pinned layers;

the second AP pinned layer structure having a second antiparallel coupling (APC) layer and third and fourth antiparallel (AP) pinned layers with the second APC layer located between the third and fourth AP pinned layers;

the first AP pinned layer having said first side in the first AP pinned layer structure, the second AP pinned layer having said second side in the first AP pinned layer structure, the third AP pinned layer having said second side in the second AP pinned layer structure and the four th AP pinned layer having said first side in the second AP pinned layer structure;

the second AP pinned layer having a magnetic thickness which is greater than a magnetic thickness of the first AP pinned layer and the fourth AP pinned layer having a magnetic thickness that is greater than a magnetic of the third AP pinned layer; and the magnetic thicknesses of the second and fourth AP pinned layers being equal and the magnetic thicknesses of the first and third AP pinned layers being equal;

a housing;

a magnetic disk rotatably supported in the housing;

a support mounted in the housing for supporting the magnetic head assembly with said air bearing surface facing the magnetic disk so that the magnetic head assembly is in a transducing relationship with the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator for exchanging signals with the magnetic head assembly, for controlling movement of the magnetic disk and for controlling the position of the magnetic head assembly.

32. A magnetic disk drive as claimed in claim 31 including:

each of the first and second pinning layers being composed of platinum manganese (PtMn); and a first seed layer composed of aluminum oxide ($Al_2O_3$), a second seed layer composed of nickel manganese oxide (NiMnO) and a third seed layer composed of tantalum (Ta) with the second seed layer located between the first and third seed layers and the first pinning layer interfacing the third seed layer.

33. A method of making a magnetic read head that has an air being surface, comprising the steps of:

making a dual spin valve sensor including the steps of:

forming antiferromagnetic first and second pinning layers;

ferromagnetic first and second antiparallel (AP) pinned layer structures between the first and second pinning layers with a first side of the first AP pinned layer structure interfacing the first pinning layer and a first side of the second AP pinned layer structure interfacing the second pinning layer so that the first AP pinned layer structure has a net magnetic moment oriented perpendicular to the air bearing surface and the second AP pinned layer structure has a net magnetic moment oriented antiparallel to the net magnetic moment of the first AP pinned layer structure so that the net magnetic moment of the first AP pinned layer structure causes a demagnetizing field on the free layer which is oriented in a direction perpendicular to the air bearing surface and the net magnetic moment of the second AP pinned layer structure causes a demagnetizing field on the free layer which is oriented in a direction which is antiparallel to the demagnetizing field of the first AP pinned layer structure;

forming nonmagnetic electrically conductive first and second spacer layers between the first and second AP pinned layer structures with a first side of the first spacer layer interfacing a second side of the first AP pinned layer structure and a first side of the second spacer layer interfacing a second side of the second AP pinned layer structure; and forming a ferromagnetic free layer between the first and second spacer layers with a first side of the free layer interfacing a second side of the first spacer layer and a second side of the free layer interfacing a second side of the second spacer layer so that the first AP pinned layer structure exerts a ferromagnetic coupling field on the free layer which is oriented perpendicular to the air bearing surface and the second AP pinned layer structure exerts a ferromagnetic coupling field on the free layer which is oriented antiparallel to the ferromagnetic coupling field of the first AP pinned layer structure.

34. A method of making a magnetic read head as claimed in claim 33 including the steps of:

forming ferromagnetic first and second shield layers; and forming nonmagnetic and insulative first and second read gap layers between the first and second shield layers.

35. A method of making a magnetic read head as claimed in claim 34 including the steps of:

forming the first AP pinned layer structure of a first antiparallel coupling (APC) layer and first and second antiparallel (AP) pinned layers with the first APC layer located between the first and second AP pinned layers;

forming the second AP pinned layer structure with a second antiparallel coupling (APC) layer and third and fourth antiparallel (AP) pinned layers with the second APC layer located between the third and fourth AP pinned layers;

forming the first AP pinned layer with said first side of the first AP pinned layer structure, forming the second AP pinned layer with said second side of the first AP pinned layer structure, forming the third AP pinned layer with said second side of the second AP pinned layer structure and forming the fourth AP pinned layer with said first side of the second AP pinned layer structure; and forming the second AP pinned layer with a magnetic thickness which is greater than a magnetic thickness of the first AP pinned layer and forming the fourth AP pinned layer with a magnetic thickness that is greater than a magnetic thickness of the third AP pinned layer.

36. A method of making a magnetic read head as claimed in claim 34 including the steps of:

forming the first AP pinned layer structure with a first antiparallel coupling (APC) layer and first and second antiparallel (AP) pinned layers with the first APC layer located between the first and second AP pinned layers;

forming the second AP pinned layer structure with a second antiparallel coupling (APC) layer and third and fourth antiparallel (AP) pinned layers with the second APC layer located between the third and fourth AP pinned layers;

forming the first AP pinned layer with said first side of the first AP pinned layer structure, forming the second AP pinned layer with said second side of the first AP pinned layer structure, forming the third AP pinned layer with said second side of the second AP pinned layer structure and forming the fourth AP pinned layer with said first side of the second AP pinned layer structure; and forming the first AP pinned layer with a magnetic thickness which is greater than a magnetic thickness of the second AP pinned layer and forming the third AP pinned layer with a magnetic thickness that is greater than a magnetic thickness of the fourth AP pinned layer.

37. A method of making a magnetic read head as claimed in claim 34 further comprising the steps of:

forming the first AP pinned layer structure with a first antiparallel coupling (APC) layer and first and second antiparallel (AP) pinned layers with the first APC layer located between the first and second AP pinned layers;

forming the second AP pinned layer structure with a second antiparallel coupling (APC) layer and third and fourth antiparallel (AP) pinned layers with the second APC layer located between the third and fourth AP pinned layers;

forming the first AP pinned layer with said first side of the first AP pinned layer structure, forming the second AP pinned layer with said second side of the first AP pinned layer structure, forming the third AP pinned layer with said second side of the second AP pinned layer structure and forming the fourth AP pinned layer with said first side of the second AP pinned layer structure; and the magnetic thicknesses of the first and fourth AP pinned layers being formed equal and the magnetic thicknesses of the second and third AP pinned layers being formed equal.

38. A method of making a magnetic read head as claimed in claim 34 wherein the first spacer layer is formed with a thickness that is greater than a thickness of the second spacer layer.

39. A method of making a magnetic read head as claimed in claim 38 wherein the demagnetizing field of the first AP pinned layer structure is formed equal to the demagnetizing field of the second AP pinned layer structure.

40. A method of making a magnetic read head as claimed in claim 39 further comprising the steps of:

forming the first AP pinned layer structure with a first antiparallel coupling (APC) layer and first and second antiparallel (AP) pinned layers with the first APC layer located between the first and second AP pinned layers;

forming the second AP pinned layer structure with a second antiparallel coupling (APC) layer and third and fourth antiparallel (AP) pinned layers with the second APC layer located between the third and fourth AP pinned layers;

forming the first AP pinned layer with said first side of the first AP pinned layer structure, forming the second AP pinned layer with said second side of the first AP pinned layer structure, forming the third AP pinned layer with said second side of the second AP pinned layer structure and forming the fourth AP pinned layer with said first side of the second AP pinned layer structure; and the magnetic thicknesses of the first and fourth AP pinned layers being formed equal and the magnetic thicknesses of the second and third AP pinned layers being formed equal.

41. A method of making a magnetic read head that has an air bearing surface, comprising the steps of:

forming ferromagnetic first and second shield layers;

forming nonmagnetic and insulative first and second read gap layers between the first and second shield layers;

forming a dual spin valve sensor between the first and second read gap layers;

a making of the dual spin valve sensor including the steps of:

forming antiferromagnetic first and second pinning layers;

forming ferromagnetic first and second antiparallel (AP) pinned layer structures between the first and second pinning layers with a first side of the first AP pinned layer structure interfacing the first pinning layer and a first side of the second AP pinned layer structure interfacing the second pinning layer so that the first AP pinned layer structure has a net magnetic moment oriented perpendicular to the air bearing surface and the second AP pinned layer structure has a net magnetic moment oriented antiparallel to the net magnetic moment of the first AP pinned layer structure so that the net magnetic moment of the first AP pinned layer structure causes a demagnetizing field on the free layer which is oriented in a direction perpendicular to the air bearing surface and the net magnetic moment of the second AP pinned layer structure causes a demagnetizing field on the free layer which is oriented in a direction which is antiparallel to the demagnetizing field of the first AP pinned layer;

the demagnetizing field of the first AP pinned layer structure being formed equal to the demagnetizing field of the second AP pinned layer structure;

forming nonmagnetic electrically conductive first and second spacer layers between the first and second AP pinned layer structures with a first side of the first spacer layer interfacing a second side of the first AP pinned layer structure and a first side of the second spacer layer interfacing a second side of the second AP pinned layer structure;

the first spacer layer being formed with a thickness that is greater than a thickness of the second spacer layer;

forming a ferromagnetic free layer between the first and second spacer layers with a first side of the free layer interfacing a second side of the first spacer layer and a second side of the free layer interfacing a second side of the second spacer layer so that the first AP pinned layer structure exerts a ferromagnetic coupling field on the free layer which is oriented perpendicular to the air bearing surface and the second AP pinned layer structure exerts a ferromagnetic coupling field on the free layer which is oriented antiparallel to the ferromagnetic coupling field of the first AP pinned layer structure;

forming the dual spin valve sensor between the first and second read gap layers with the free layer being centered between the first and second shield layers so that image current fields from the first and second shield layers on the free layer counterbalance each other resulting in a net image current field of zero;

forming the first AP pinned layer structure with a first antiparallel coupling (APC) layer and first and second antiparallel (AP) pinned layers with the first APC layer located between the first and second AP pinned layers;

forming the second AP pinned layer structure with a second antiparallel coupling (APC) layer and third and fourth antiparallel (AP) pinned layers with the second APC layer located between the third and fourth AP pinned layers;

forming the first AP pinned layer with said first side in the first AP pinned layer structure, forming the second AP pinned layer with said second side in the first AP pinned layer structure, forming the third AP pinned layer with said second side in the second AP pinned layer structure and forming the fourth AP pinned layer with said first side in the second AP pinned layer structure;

forming the first AP pinned layer with a magnetic thickness which is greater than a magnetic thickness of the second AP pinned layer and forming the third AP pinned layer with a magnetic thickness that is greater than a magnetic thickness of the fourth AP pinned layer; and the magnetic thicknesses of the second and fourth AP pinned layers being formed equal and the magnetic thicknesses of the first and third AP pinned layers being formed equal.

42. A method of making a magnetic read head as claimed in claim 41 including the steps of:

forming each of the first and second pinning layers of platinum manganese (PtMn); and forming a first seed layer of aluminum oxide ($Al_2O_3$), forming a second seed layer of nickel manganese oxide (NiMnO) and forming a third seed layer of tantalum (Ta) with the second seed layer located between the first and third seed layers and the first pinning layer interfacing the third seed layer.

43. A method of making a magnetic head assembly that has an air bearing surface, comprising the steps of:

making a write head as follows:
  forming ferromagnetic first and second pole piece layers that have a yoke portion located between a pole tip portion and a back gap portion;
  forming a nonmagnetic write gap layer between the pole tip portions of the first and second pole piece layers;
  forming an insulation stack with at least one coil layer embedded therein between the yoke portions of the first and second pole piece layers; and
  connecting the first and second pole piece layers at their back gap portions; and making a dual spin valve sensor including the steps of:
  forming antiferromagnetic first and second pinning layers;
  forming ferromagnetic first and second antiparallel (AP) pinned layer structures between the first and second pinning layers with a first side of the first AP pinned layer structure interfacing the first pinning layer and a first side of the second AP pinned layer structure interfacing the second pinning layer so that the first AP pinned layer structure has a net magnetic moment oriented perpendicular to the air bearing surface and the second AP pinned layer structure has a net magnetic moment oriented antiparallel to the net magnetic moment of the first AP pinned layer structure so that the net magnetic moment of the first AP pinned layer structure exerts a demagnetizing field on the free layer which is oriented in a direction perpendicular to the air bearing surface and the net magnetic moment of the second AP pinned layer structure exerts a demagnetizing field on the free layer which is oriented in a direction which is antiparallel to the demagnetizing field of the first AP pinned layer structure;

forming nonmagnetic electrically conductive first and second spacer layers between the first and second AP pinned layer structures with a first side of the first spacer layer interfacing a second side of the first AP pinned layer structure and a first side of the second spacer layer interfacing a second side of the second AP pinned layer structure; and forming a ferromagnetic free layer between the first and second spacer layers with a first side of the free layer interfacing a second side of the first spacer layer and a second side of the free layer interfacing a second side of the second spacer layer so that the first AP pinned layer structure exerts a ferromagnetic coupling field on the free layer which is oriented perpendicular to the air bearing surface and the second AP pinned layer structure exerts a ferromagnetic coupling field on the free layer which is oriented antiparallel to the ferromagnetic coupling field of the first AP pinned layer structure.

44. A method of making a magnetic head assembly as claimed in claim 43 wherein the first pole layer and the second shield layer are formed as a common layer.

45. A method of making a magnetic head assembly as claimed in claim 43 including forming a nonmagnetic isolation layer between the second shield layer and the first pole piece layer.

46. A method of making a magnetic head assembly as claimed in claim 43 including the steps of:

forming ferromagnetic first and second shield layers; and forming nonmagnetic and insulative first and second read gap layers between the first and second shield layers.

47. A method of making a magnetic head assembly as claimed in claim 46 including the steps of:

forming the first AP pinned layer structure of a first antiparallel coupling (APC) layer and first and second antiparallel (AP) pinned layers with the first APC layer located between the first and second AP pinned layers;

forming the second AP pinned layer structure with a second antiparallel coupling (APC) layer and third and fourth antiparallel (AP) pinned layers with the second APC layer located between the third and fourth AP pinned layers;

forming the first AP pinned layer with said first side of the first AP pinned layer structure, forming the second AP pinned layer with said second side of the first AP pinned layer structure, forming the third AP pinned layer with said second side of the second AP pinned layer structure and forming the fourth AP pinned layer with said first side of the second AP pinned layer structure; and forming the second AP pinned layer with a magnetic thickness which is greater than a magnetic thickness of the first AP pinned layer and forming the fourth AP pinned layer with a magnetic thickness that is greater than a magnetic thickness of the third AP pinned layer.

48. A method of making a magnetic head assembly as claimed in claim 46 including the steps of:
  forming the first AP pinned layer structure with a first antiparallel coupling (APC) layer and first and second antiparallel (AP) pinned layers with the first APC layer located between the first and second AP pinned layers;
  forming the second AP pinned layer structure with a second antiparallel coupling (APC) layer and third and fourth antiparallel (AP) pinned layers with the second APC layer located between the third and fourth AP pinned layers;
  forming the first AP pinned layer with said first side of the first AP pinned layer structure, forming the second AP pinned layer with said second side of the first AP pinned layer structure, forming the third AP pinned layer with said second side of the second AP pinned layer structure and forming the fourth AP pinned layer with said first side of the second AP pinned layer structure; and
  forming the first AP pinned layer with a magnetic thickness which is greater than a magnetic thickness of the second AP pinned layer and forming the third AP pinned layer with a magnetic thickness that is greater than a magnetic thickness of the fourth AP pinned layer.

49. A method of making a magnetic head assembly as claimed in claim 46 further comprising the steps of:
  forming the first AP pinned layer structure with a first antiparallel coupling (APC) layer and first and second antiparallel (AP) pinned layers with the first APC layer located between the first and second AP pinned layers;
  forming the second AP pinned layer structure with a second antiparallel coupling (APC) layer and third and fourth antiparallel (AP) pinned layers with the second APC layer located between the third and fourth AP pinned layers;
  forming the first AP pinned layer with said first side of the first AP pinned layer structure, forming the second AP pinned layer with said second side of the first AP pinned layer structure, forming the third AP pinned layer with said second side of the second AP pinned layer structure and forming the fourth AP pinned layer with said first side of the second AP pinned layer structure; and
  the magnetic thicknesses of the first and fourth AP pinned layers being formed equal and the magnetic thicknesses of the second and third AP pinned layers being formed equal.

50. A method of making a magnetic head assembly as claimed in claim 46 wherein the first spacer layer is formed with a thickness that is greater than a thickness of the second spacer layer.

51. A method of making a magnetic head assembly as claimed in claim 50 wherein the demagnetizing field of the first AP pinned layer structure is formed equal to the demagnetizing field of the second AP pinned layer structure.

52. A method of making a magnetic head assembly as claimed in claim 51 further comprising the steps of:
  forming the first AP pinned layer structure with a first antiparallel coupling (APC) layer and first and second antiparallel (AP) pinned layers with the first APC layer located between the first and second AP pinned layers;
  forming the second AP pinned layer structure with a second antiparallel coupling (APC) layer and third and fourth antiparallel (AP) pinned layers with the second APC layer located between the third and fourth AP pinned layers;
  forming the first AP pinned layer with said first side of the first AP pinned layer structure, forming the second AP pinned layer with said second side of the first AP pinned layer structure, forming the third AP pinned layer with said second side of the second AP pinned layer structure and forming the fourth AP pinned layer with said first side of the second AP pinned layer structure; and
  the magnetic thicknesses of the first and fourth AP pinned layers being formed equal and the magnetic thicknesses of the second and third AP pinned layers being formed equal.

53. A method of making a magnetic head assembly that has an air bearing surface, comprising the steps of:
  making a write head as follows:
    forming ferromagnetic first and second pole piece layers that have a yoke portion located between a pole tip portion and a back gap portion;
    forming a nonmagnetic write gap layer between the pole tip portions of the first and second pole piece layers;
    forming an insulation stack with at least one coil layer embedded therein between the yoke portions of the first and second pole piece layers; and
    connecting the first and second pole piece layers at their back gap portions; and
  making a read head comprising the steps of:
    forming ferromagnetic first and second shield layers;
    forming nonmagnetic and insulative first and second read gap layers between the first and second shield layers; and
  forming a dual spin valve sensor between the first and second read gap layers;
  a making of the dual spin valve sensor including the steps of:
    forming antiferromagnetic first and second pinning layers;
    forming ferromagnetic first and second antiparallel (AP) pinned layer structures between the first and second pinning layers with a first side of the first AP pinned layer structure interfacing the first pinning layer and a first side of the second AP pinned layer structure interfacing the second pinning layer so that the first AP pinned layer structure has a net magnetic moment oriented perpendicular to the air bearing surface and the second AP pinned layer structure has a net magnetic moment oriented antiparallel to the net magnetic moment of the first AP pinned layer structure so that the net magnetic moment of the first AP pinned layer structure exerts a demagnetizing field on the free layer which is oriented in a direction perpendicular to the air bearing surface and the net magnetic moment of the second AP pinned layer structure exerts a demagnetizing field on the free layer which is oriented in a direction which is antiparallel to the demagnetizing field of the first AP pinned layer structure;
    the demagnetizing field of the first AP pinned layer structure being formed equal to the demagnetizing field of the second AP pinned layer structure;
    forming nonmagnetic electrically conductive first and second spacer layers between the first and second AP pinned layer structures with a first side of the first spacer layer interfacing a second side of the first AP pinned layer structure and a first side of the second spacer layer interfacing a second side of the second AP pinned layer structure;

the first spacer layer being formed with a thickness that is greater than a thickness of the second spacer layer;

forming a ferromagnetic free layer between the first and second spacer layers with a first side of the free layer interfacing a second side of the first spacer layer and a second side of the free layer interfacing a second side of the second spacer layer so that the first AP pinned layer structure exerts a ferromagnetic coupling field on the free layer which is oriented perpendicular to the air bearing surface and the second AP pinned layer structure exerts a ferromagnetic coupling field on the free layer which is oriented antiparallel to the ferromagnetic coupling field of the first AP pinned layer structure;

forming the dual spin valve sensor centered between the first and second shield layers so that image current fields from the first and second shield layers on the free layer counterbalance each other resulting in a net image current field of zero;

forming the first AP pinned layer structure with a first antiparallel coupling (APC) layer and first and second antiparallel (AP) pinned layers with the first APC layer located between the first and second AP pinned layers;

forming the second AP pinned layer structure with a second antiparallel coupling (APC) layer and third and fourth antiparallel (AP) pinned layers with the second APC layer located between the third and fourth AP pinned layers;

forming the first AP pinned layer with said first side in the first AP pinned layer structure, forming the second AP pinned layer with said second side in the first AP pinned layer structure, forming the third AP pinned layer with said second side in the second AP pinned layer structure and forming the fourth AP pinned layer with said first side in the second AP pinned layer structure;

forming the second AP pinned layer with a magnetic thickness which is greater than a magnetic thickness of the first AP pinned layer and forming the fourth AP pinned layer with a magnetic thickness that is greater than a magnetic thickness of the third AP pinned layer; and the magnetic thicknesses of the second and fourth AP pinned layers being formed equal and the magnetic thicknesses of the first and third AP pinned layers being formed equal.

54. A method of making a magnetic head assembly as claimed in claim 53 including the steps of:

forming each of the first and second pinning layers of platinum manganese (PtMn); and forming a first seed layer of aluminum oxide ($Al_2O_3$), forming a second seed layer of nickel manganese oxide (NiMnO) and forming a third seed layer of tantalum (Ta) with the second seed layer located between the first and third seed layers and the first pinning layer interfacing the third seed layer.

* * * * *